April 16, 1935.                J. A. KADU                   1,998,018
         STOP AND FRICTION SPRING FOR SLIDES OF MEASURING INSTRUMENTS
                         Filed March 7, 1931
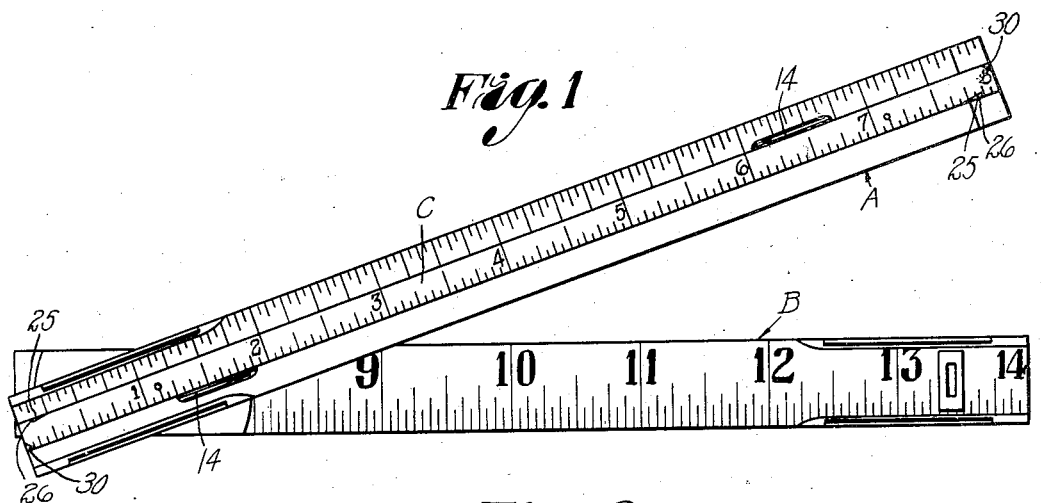
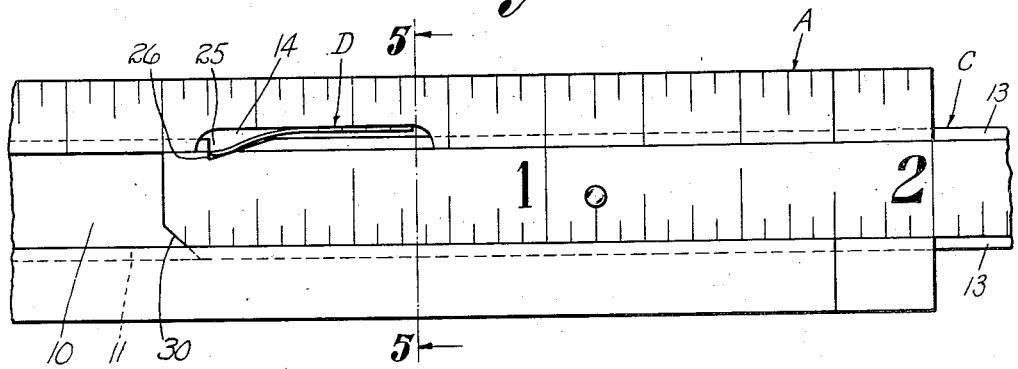
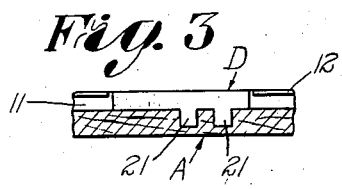
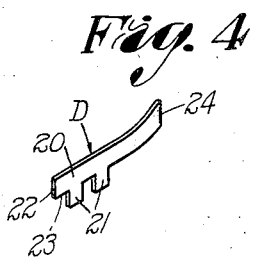
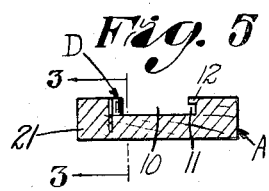
Inventor
John A. Kadu
By
Attorney Patented Apr. 16, 1935

1,998,018

UNITED STATES PATENT OFFICE 1,998,018

STOP AND FRICTION SPRING FOR SLIDES OF MEASURING INSTRUMENTS

John A. Kadu, New Britain, Conn., assignor to The Stanley Works, New Britain, Conn., a corporation of Connecticut Application March 7, 1931, Serial No. 520,855

4 Claims. (Cl. 33—106)

This invention relates generally to rules, gauges and other measuring instruments of the type having a slidable member, such as an extension slide, adapted to be moved to various positions of adjustment; and the invention has particular reference to devices for holding the slides against accidental withdrawal from members carrying the same and also for exerting on the slides sufficient pressure to hold them in any position of adjustment. In the present disclosure, the invention is illustrated as being embodied in a zigzag rule, one end section of which has an extension slide, but it is to be understood that this disclosure is by way of exemplification only and the invention may be embodied in other kinds of rules or gauges.

The aim of the invention is to provide a measuring instrument of this sort with improved means, of a simple and effective character, for limiting the extent to which the slide may be moved so that it will not be accidentally withdrawn, and for frictionally holding the slide in any position of adjustment, the arrangement being such that, when desired, the extension slide may be entirely removed in a quick and ready manner.

A further aim of the invention is to provide a stop and friction spring of this character which may be manufactured at a relatively low cost; which may be very quickly and easily applied to the measuring instrument; and which is effective in its operation.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one of the embodiments which the present invention may take:

Figure 1 is a face view of two sections or legs of a zigzag rule, one section having an extension slide to which the springs of the present invention are applied;

Fig. 2 is a face view, on an enlarged scale, of a portion of the rule and slide, the latter being shown in one of its extreme positions where it is held against further withdrawal by one of the improved stops;

Fig. 3 is a longitudinal sectional view through the end section of the slide just inwardly of the friction stop spring, that is, along the line 3—3 of Fig. 5;

Fig. 4 is a perspective view of the stop spring; and

Fig. 5 is a sectional view taken on line 5—5 of Fig. 2.

Referring to the drawing in detail, the improvements, as stated, are shown as incorporated in a zigzag rule, only the first leg or section A and the section B being illustrated. These sections may be hingedly connected together in any suitable manner and bear the usual scale marks. The end section A is provided with a longitudinally extending channel 10, the side walls of which are undercut to provide grooves 11 and gibs or ribs 12 as is usual in most rules of this sort. The extension slide, designated by the letter C, fits in the channel 10 and has, at each side, a rib 13, which ribs respectively engage in the grooves 11 behind the ribs 12.

In the present illustrative disclosure, the extension slide is illustrated as being associated with two stop springs constructed in accordance with the present invention, these springs being located adjacent opposite ends of the section A and to opposite sides of the extension slide C. These springs, designated generally by the letter D, are similarly constructed, but are positioned in reverse relation to one another so as to prevent accidental withdrawal of the slide from the channel in both directions. The side walls of the channel are recessed so as to form pockets 14 which accommodate these springs.

Each of the springs comprises a thin, relatively narrow strip 20 of spring or resilient metal. This strip, for the major part of its length, is straight, and the strip is curved or bent at one end so as to provide a spring finger adapted to engage the side edge of the extension slide and to cooperate with an abutment thereon. Projecting downwardly from the straight portion of the spring are a plurality of projections 21, two such projections being illustrated and, by preference, these projections are square and are spaced apart a distance which is approximately equal to the width of a lug. The rearmost lug is, by preference, spaced from the butt or rear end 22 of the strip so as to leave a bottom shoulder 23. The free or operating end of the spring, and which end constitutes a stop shoulder, is designated by the numeral 24.

The stop spring is secured in place by merely positioning the same along the side wall of a pocket and then driving the lugs into the rule until the lower edge of the strip 20 engages the bottom wall of the pocket. Thus, it will be seen that the stop springs, which are extremely simple in construction and which, therefore, may be cheaply manufactured, may be very easily and quickly assembled on the rule. The two lugs securely hold the spring in place, and the fact that the rear lug is spaced from the butt end of the spring provides additional security against the spring being pulled out because the shoulder 23 rests upon the bottom surface of the pocket and serves as a lever.

The springs, adjacent their free ends, engage opposite side edges of the slide and serve to hold the slide against accidental displacement from any position of adjustment. The springs more or less act as brakes. The slide has, at each end, a notch 25 which terminates in a transverse shoulder or abutment 26. Each abutment faces away from the end of the slide adjacent which it is positioned. The bottom wall of each notch is inclined as illustrated. The notches are on opposite sides of the slide. The slide has, at each end, one of its corners cut away or beveled so as to provide a transversely inclined cam surface 30. These cam surfaces serve to cam the springs out of the way of the ends of the slide when such ends are brought into engagement therewith. With this arrangement, it will be seen that the slide may be longitudinally moved from the position shown in Fig. 1 so as to extend beyond either end of the section A and that, when the rule is so moved a predetermined extent, one of the shoulders, depending upon which way the slide is moved, will come into engagement with the free end of the associated spring so that further movement cannot take place unless the free end of the spring is withdrawn into the pocket. Thus, any likelihood of the slide being accidentally withdrawn from, or dropping out of, the channel of the section A is guarded against. In Fig. 2, the slide is in its extreme extended position beyond the free end of the section A and, in this position, the upper spring engages against the shoulder 26 of the upper notch. When the slide is moved back to its central or normal position, the cam surface 30, shown in this figure, will engage the projecting end of the lower spring, and force that spring back into its notch. The slide may be removed at will by merely inserting the finger nail against the free end of the spring and urging the same into the pocket and then sliding the slide from place. In some cases, it is desired to entirely remove the slide in order to use it when taking depth or other measurements in small recesses or holes which could not otherwise be conveniently measured.

As many changes could be made in the above construction and many widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a measuring instrument having a member provided with a channel with undercut grooves at each side and a pocket in a side wall of the channel, a slide mounted in said channel and having its side edges engaging in said grooves and said slide being provided adjacent one end with a shoulder, and a stop spring located in said pocket comprising a strip of metal, one end of which is bent to engage against the side edge of said slide and to engage against said shoulder when the slide is moved to a predetermined position, said strip having a plurality of depending lugs driven into said member whereby said spring is anchored in place.

2. In a measuring instrument, a member having a channel, a slide mounted in said channel and adapted to extend beyond both ends of said member, said slide having, at each side, an abutment, said abutments being positioned at opposite ends of the slide, said channel having, adjacent each end and at each side of said slide, a pocket, and a stop and friction spring located and anchored in each pocket, said springs having free ends disposed in opposite directions and adapted to respectively cooperate with said abutments.

3. In a measuring instrument, a member having a channel with a pocket in a side wall of the channel, a slide mounted in said channel and having a shoulder in one of its side edges and adjacent one end, and a stop and friction spring located in said pocket and having a free end constituting an abutment adapted to engage against said shoulder, said slide having its corner remote from said pocket beveled so as to provide a cam surface adapted to force the spring into said pocket.

4. In a measuring instrument, a member having a channel, a slide mounted in said channel and adapted to extend beyond both ends of said member, said slide having, at each side, an abutment, said abutments being positioned at opposite ends of the slide, said channel having, adjacent each end and at each side of said slide, a pocket, and a stop and friction spring located and anchored in each pocket, said springs having free ends disposed in opposite directions and adapted to respectively cooperate with said abutments, said slide having beveled corners adapted to cam said springs into said pockets.

JOHN A. KADU.